Patented Dec. 29, 1942

2,306,826

UNITED STATES PATENT OFFICE 2,306,826

METHOD FOR THE MANUFACTURE OF ALUMINUM ACETATE

Majer Mendelsohn, New York, N. Y.

No Drawing. Application October 13, 1941,
Serial No. 414,904

3 Claims. (Cl. 260—448)

The invention relates to a method for the manufacture of aluminum acetate.

This substance which is mostly used for therapeutical and pickling purposes and in the manufacture of textiles is hitherto only known in the form of an aqueous solution.

The drawbacks resulting from the liquid state are numerous. The solution is unstable and gradually decomposes; the decomposition products settling down in the solution form a coherent deposit the uniform distribution of which in the solution is tiresome and difficult. Needless to state that the efficiency of the thus produced emulsion is greatly reduced. Furthermore, handling and transport of the salt due to its liquid state is difficult and expensive.

Several methods have been suggested to stabilize the aluminum acetate solution and to prevent its decomposiiton; hereby the grave disadvantage results of a variation of the pH value.

It is the object of the invention to produce a completely water soluble aluminum acetate in the solid form.

It is a further object of the invention to produce an aluminum acetate which does not decompose.

It is also an object of the invention to produce at will the aluminum acetate as a neutral tribasic, dibasic and monobasic solid compound.

Furthermore, it is an object of the invention to obviate the drawbacks resulting from the use of the hitherto known aluminum acetate liquors.

In the performance of the invention use is made of the lately established recognition that chemical reactions may be carried-out in the solid state to a far greater extent than this has been hitherto considered possible. Actually the performance of reactions in the solid state of the reactants has been practiced for a long time in the manufacture of colored ceramic articles.

The inventor has found that the theory of performing reactions in the solid state may well be applied to the manufacture of aluminum acetate and that by reacting solid acetic acid salts and aluminum salts under suitable conditions aluminum acetates are directly obtained as solid products. The sodium, potassium calcium acetates and the aluminum chloride and nitrate have proved to be most suitable for carrying-out the present method.

If, for instance, pulverulent aluminum chloride and sodium acetate are reacted together, a neutral aluminum acetate is formed in accordance with the following equation:

$$AlCl_3 + 3(CH_3COO)Na = Al(CH_3COO)_3 + 3NaCl$$

In order to promote and to complete the conversion of the reactants the same must be stirred and contacted with each other in order to accelerate the liberation from their crystal-grids and their direct diffusion.

The reaction is strongly exothermic and becomes particularly vehement if aluminum chloride or nitrate and alkali acetates are used. In these cases cooling is indispensable.

The theoretical temperature range within which the method may be performed is rather wide and lies between 180° C. and —5° C. However, it is advisable to work at the lower temperature of between about 40 to 50° C.

By determining the caloric effect of the reaction at —5° C. it has been possible to prove that at this temperature a theoretically complete conversion has taken place whereby the neutral salt is formed in the solid state according to the previously given equation. The time needed for the completion of the reaction is approximately two hours. If working at higher temperatures the dibasic, the monobasic salts and mixtures of the same at varying ratio are attained.

Reactions in the solid state being intensified if the liberation of the reacting salt components from their crystal grids is improved, the inventor has stated that the admixture of a small quantity of ammonium chloride of between about ½ to 3% has a highly favorable influence inasmuch as the time of the reaction is hereby shortened.

*Examples*

(1) 20 to 23 parts by weight of dry aluminum chloride and 40 to 50 parts by weight of dry sodium acetate are ground and mixed. The mixture is fed into a rotatable drum which is surrounded by a water jacket. The inner wall of the drum is provided with stirring blades. The reaction commences immediately upon the drum being set in motion. The temperature is maintained by cooling at about 2° C. After about two hours the conversion is completed. The resulting product is a dry mixture of neutral aluminum acetate and sodium chloride.

(2) 25 to 30 parts by weight of ground dry aluminum chloride, 38 to 42 parts by weight of ground dry sodium acetate and .3 part by weight of ammonium chloride are reacted in the same manner as described under (1) for a time of one hour and at a temperature of 15° C. The resulting product is a dry mixture of neutral aluminum acetate and sodium chloride.

A separation of the aluminum acetate from the second reaction product can be easily effected; however, in most of the applications of the aluminum acetate this is not even necessary.

I claim:

1. A method for the manufacture of aluminum acetate comprising reacting by continuous stirring at least one substance in the solid pulverulent state selected from the group consisting of aluminum chloride and aluminum nitrate with at least one substance in the solid pulverulent state selected from the group consisting of alkali and earth-alkali acetate at an approximately molecular ratio and at a temperature of between about 40° to −5° C. and obtaining hereby a mixture of aluminum acetate and the second reaction product in the solid state.

2. A method for the manufacture of aluminum acetate comprising reacting by continuous stirring and cooling approximately 20 to 30 parts by weight of at least one substance in the solid pulverulant state selected from the group consisting of aluminum chloride and aluminum nitrate with about 38 to 45 parts by weight of at least one substance in the solid pulverulent state selected from the group consisting of alkali and earth alkali acetate at a temperature of between about 40° to −5° C., and obtaining hereby a mixture of aluminum acetate and the second reaction product in the solid state.

3. A method for the manufacture of aluminum acetate comprising reacting by continuous stirring at least one substance in the solid pulverulent state selected from the group consisting of aluminum chloride and aluminum nitrate with at least one substance in the solid pulverulent state selected from the group consisting of alkali and earth-alkali acetate at an approximately molecular ratio and at a temperature of between about 40° to −5° C. in the presence of about ½ to 3% ammonium chloride and obtaining hereby a mixture of aluminum acetate and of the secondary reaction product in the solid state.

MAJER MENDELSOHN.